(12) United States Patent
Pedersen et al.

(10) Patent No.: US 6,325,928 B1
(45) Date of Patent: Dec. 4, 2001

(54) IMMERSED MEMBRANE ELEMENT AND MODULE

(75) Inventors: Steven Pedersen, Burlington; Pierre Cote, Dundas, both of (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 09/505,718

(22) Filed: Feb. 17, 2000

(30) Foreign Application Priority Data

Nov. 18, 1999 (CA) .................................................. 2290053

(51) Int. Cl.$^7$ ............................. B01D 63/02; B01D 63/04
(52) U.S. Cl. ................ 210/232; 210/321.69; 210/321.8; 210/321.89; 210/500.23
(58) Field of Search ................................ 210/232, 323.2, 210/321.69, 321.79, 321.8, 321.88, 321.89, 500.23, 220, 221.2, 640; 96/10

(56) References Cited

U.S. PATENT DOCUMENTS

| 4,781,832 | 11/1988 | Takemura et al. ................ 210/321.8 |
| 5,104,535 | 4/1992 | Cote et al. .......................... 210/321.8 |
| 5,182,019 | 1/1993 | Cote et al. .......................... 210/321.8 |
| 5,192,456 | 3/1993 | Ishida et al. ........................... 210/791 |
| 5,230,796 * | 7/1993 | Ter Meulen ...................... 210/321.89 |
| 5,248,424 | 9/1993 | Cote et al. ............................ 210/636 |
| 5,480,553 | 1/1996 | Yamamori et al. .................. 210/650 |
| 5,639,373 | 6/1997 | Mahendran et al. ................. 210/636 |
| 5,783,083 | 7/1998 | Henshaw et al. .................... 210/636 |
| 5,922,201 | 7/1999 | Yamamori et al. ............. 210/321.79 |
| 6,103,118 * | 8/2000 | Ter Meulen ...................... 210/321.89 |

FOREIGN PATENT DOCUMENTS

| 0598909 | 6/1994 | (EP) . |
| 0931582 | 7/1999 | (EP) . |
| 60261509 | 12/1985 | (JP) . |
| 2144712 * | 6/1987 | (JP) ................................ 210/321.89 |

(List continued on next page.)

OTHER PUBLICATIONS

Suda, K. et al., "Development of a tank–submerged type membrane filtration system", 06/98, p. 151–58.

* cited by examiner

*Primary Examiner*—Joseph W. Drodge
(74) *Attorney, Agent, or Firm*—Bereskin & Parr (57) ABSTRACT

A filtering element has ultrafiltration or microfiltration hollow fibre membranes extending horizontally between a pair of opposed horizontally spaced, vertically extending headers. Side plates extending between the pair of vertically extending headers define a vertical flow channel through the element. Modules are created by placing the elements side by side or in an orthogonal grid. A frame restrains the elements in place without obstructing the vertical flow channels. Each element may be released from the frame, however, and removed by sliding it in a direction substantially normal to its headers without disassembling the remainder of the module. The elements have associated releasable water tight fittings between the elements and a permeate collector, the releasable water tight fittings being releasable by removing of an element from the frame. An aerator is located below the module with a plurality of air holes.

12 Claims, 7 Drawing Sheets

FOREIGN PATENT DOCUMENTS

| | | |
|---|---|---|
| 440221 | 2/1992 | (JP) . |
| 2946072 | 1/1995 | (JP) . |
| 7024264 | 1/1995 | (JP) . |
| 7024272 | 1/1995 | (JP) . |
| 7155564 | 6/1995 | (JP) . |
| 7178321 | 7/1995 | (JP) . |
| 7275665 | 7/1995 | (JP) . |
| 7289859 | 11/1995 | (JP) . |
| 8019730 | 1/1996 | (JP) . |
| 8257372 | 10/1996 | (JP) . |
| 8332483 | 12/1996 | (JP) . |
| 9099222 | 4/1997 | (JP) . |
| 9215980 | 8/1997 | (JP) . |
| 10118470 | 5/1998 | (JP) . |
| 10244262 | 9/1998 | (JP) . |
| 11076764 | 3/1999 | (JP) . |
| 11104466 | 4/1999 | (JP) . |
| 11165200 | 6/1999 | (JP) . |
| WO/98/28066 | 7/1998 | (WO) . |
| WO/99/29630 | 6/1999 | (WO) . |

IMMERSED MEMBRANE ELEMENT AND MODULE

FIELD OF THE INVENTION

This invention relates to an element and module of hollow fibre filtering membranes of the type normally immersed in a tank and used to withdraw a filtered permeate by means of suction applied to the lumens of the membranes.

BACKGROUND OF THE INVENTION

The inventors herein and others developed a module of filtering hollow fibre membranes which they described in U.S. Pat. No. 5,248,424, issued on Sep. 28, 1993. In this module, hollow fibre membranes are held in fluid communication with a pair of horizontally spaced headers to form modules in a variety of configurations in which the fibres vary from being substantially horizontal to substantially vertical. To produce permeate, transmembrane pressure ("TMP") is provided by suction on the lumens of the fibres.

Subsequently, further shell-less membrane modules based in part on similar principles appeared with hollow fibre membranes in both substantially vertical and substantially horizontal orientations. Shell-less modules with membranes oriented vertically are shown in U.S. Pat. No. 5,639,373 issued to Zenon Environmental Inc. on Jun. 17, 1997; U.S. Pat. No. 5,783,083 issued to Zenon Environmental Inc. on Jul. 21, 1998 and PCT Publication No. WO 98/28066 filed on Dec. 18, 1997 by Memtec America Corporation. In these modules, the horizontally spaced headers are replaced by headers spaced vertically only.

Shell-less modules with membranes oriented horizontally are described, for example, in U.S. Pat. No. 5,480,553 issued to Mitsubishi Rayon Co., Ltd on Jan. 2, 1996; European published application EP 0,931,582 filed on Aug. 8, 1997 by Mitsubishi Rayon Co., Ltd and in an article, "Development of a tank-submerged type membrane filtration system", by K. Suda et. al. of Ebara Corporation published in Desalination 119 (1998) 151–158.

Despite these developments, membrane filtration technology is not widely used for creating potable water. Sand filters are still used more often, largely because of their lower cost for a given capacity. For example, tests by the Ebara Corporation were reported in the article mentioned above. While the authors achieved stable operation over extended periods of time, the tank superficial velocity (the flux of permeate, typically in $m^3/h$, divided by the tank footprint, typically in $m^2$) was only about 1.7 m/h. In comparison, a typical sand filtration system has a tank superficial velocity of 5–10 m/h allowing for the use of much smaller tanks, a significant cost in a large municipal or industrial system. Modules of vertical membranes produced by Zenon Environmental Inc. have been operated to produce tank superficial velocities of over 10 m/h but while using strong membranes supported with a substrate and fairly intense aeration. Both the complex membranes and the intense aeration increase the cost of such technology. Finally, the cost of maintaining known membrane modules is also a concern. In particular, leaks or defects in a single membrane are difficult to locate or isolate and often require large sections of a filtration system to be taken off line for their repair.

SUMMARY OF THE INVENTION

It is an object of the present invention to provide a hollow fibre filtering membrane element and module. It is another object of the present invention to provide a process which uses immersed filtering membranes, particularly as part of a process of producing potable water.

In one aspect, the invention is directed at an element having hollow fibre membranes attached to and suspended between a pair of opposed horizontally spaced, vertically extending headers. Side plates extending between the pair of vertically extending headers define a vertical flow channel through the element. The hollow fibre membranes are arranged in bundles which, when dispersed, fill a central portion of the vertical flow channel. Preferably, only one header of the pair of headers has a permeate channel and the hollow fibre membranes are fixedly attached to the other header.

A module of filtering hollow fibre membranes is made by arranging such elements side by side or in an orthogonal grid such that the side plates and headers of the elements form a plurality of directly adjacent vertical flow channels. A frame restrains the elements in place without obstructing the vertical flow channels. The restraint provided by the frame may be released for a selected element, however, allowing the selected element to be removed or replaced in a direction substantially normal to its headers without disassembling the remainder of the module. Each element has an associated releasable and resealable water tight fitting between the element and a permeate collector, the releasable water tight fitting being released when the element is removed from the module. An aerator below the module has a plurality of air holes located to provide a line of air holes below each element or below a side plate between each pair of elements.

With such modules, membrane defects can be accurately located by a bubble point test applied to each row of the module in turn. The presence of bubbles in a particular flow channel indicates which, if any, elements of a row are defective. Once located, a defective element is replaced with a new element allowing permeation to resume while the defective element is repaired.

In another aspect, the invention is directed at a process for filtering water using such elements or modules. In the process, permeate flux is less than 50 $L/m^2/h$, preferably less than 35 $L/m^2/h$, and aeration to scrub the membranes is provided when permeation is periodically stopped. A tank containing the elements or modules is emptied and refilled from time to time to remove accumulated solids. Gentler aeration may be provided during permeation to homogenize the contents of the tank. Such a process is both gentle on the membranes and energy efficient. Use of the process and element design of the invention allows inexpensive membranes to be used to create elements having a membrane surface area of at least 500 $m^2$ for every cubic metre of element volume and provides good yield at acceptable energy costs.

BRIEF DESCRIPTION OF THE DRAWINGS

Preferred embodiments of the present invention will now be described with reference to the following figures.

DETAILED DESCRIPTION OF EMBODIMENTS

Figure 1:
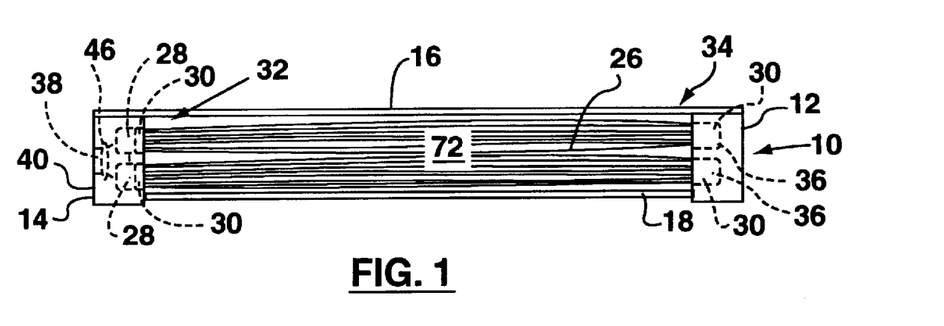
FIG. 1 is a plan view of a filtering element.
Figure 2:
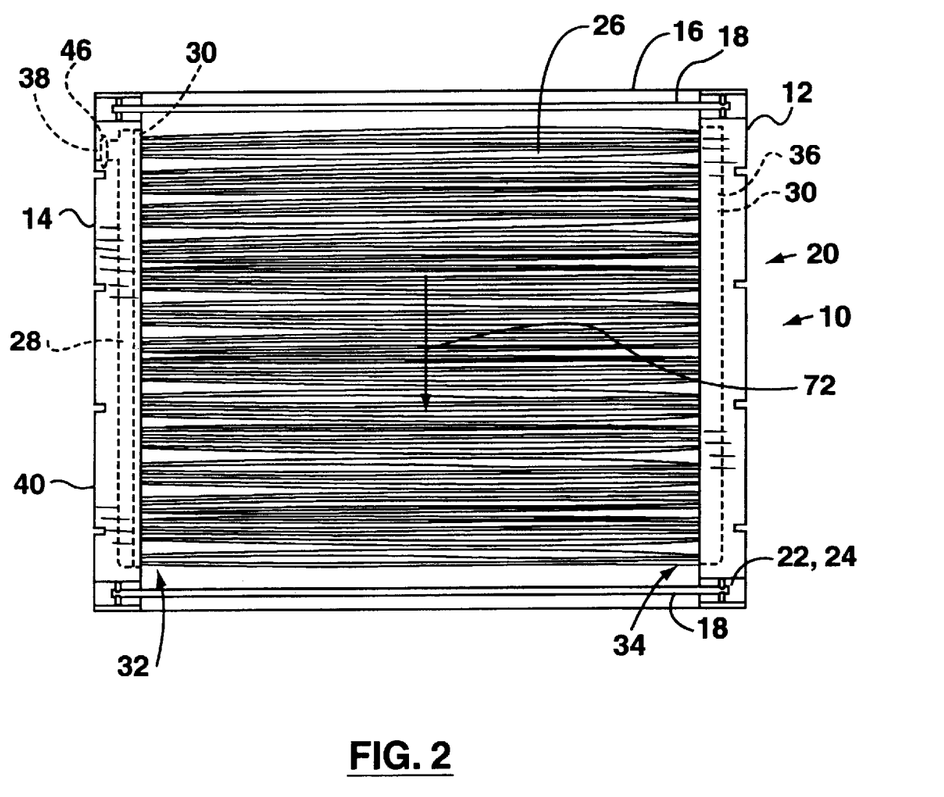
FIG. 2 is an elevation view of the filtering element of FIG. 1.
Figure 3:
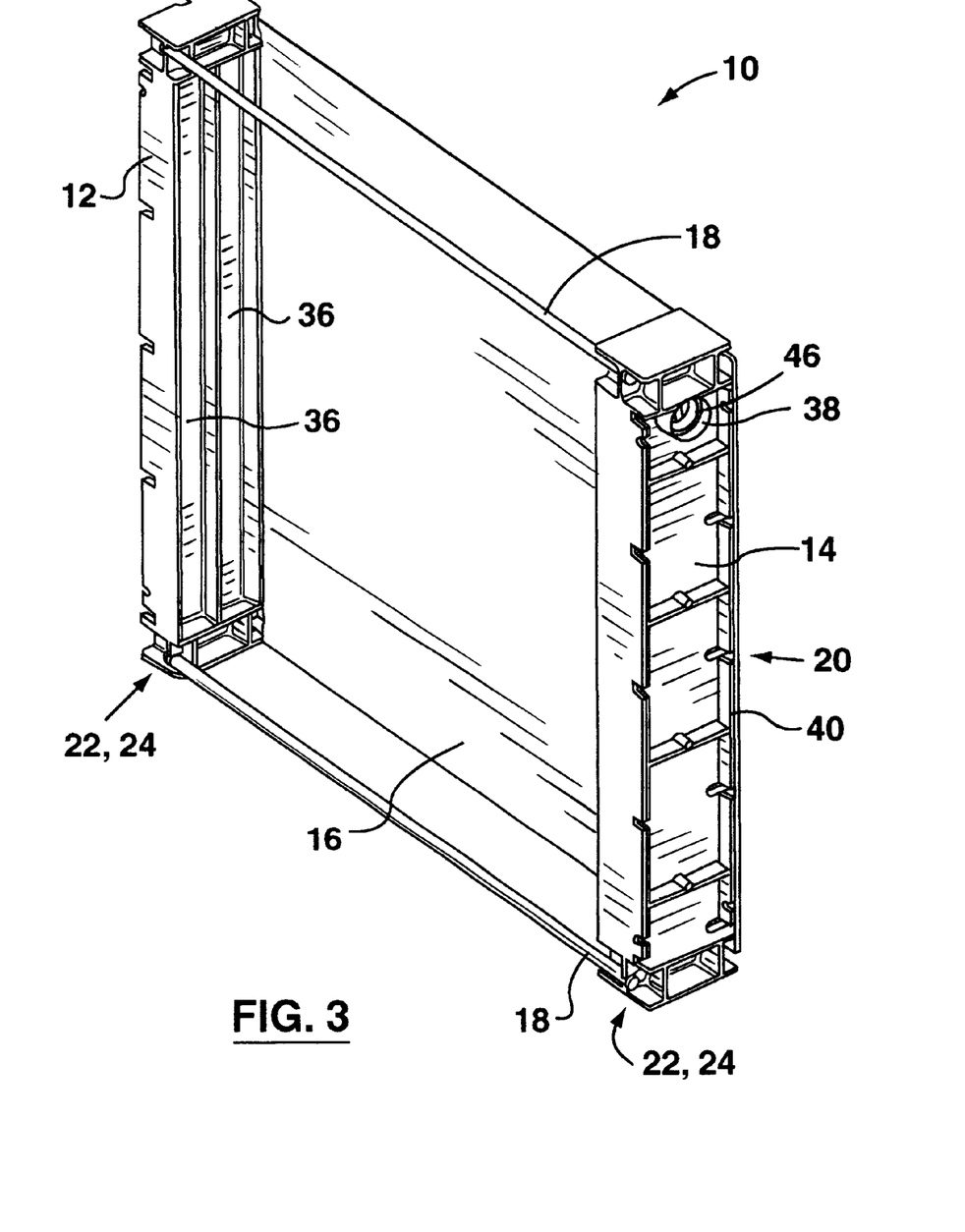
FIG. 3 is an isometric view of the filtering element of FIG. 1 (but without membranes).

Referring now to FIGS. 1, 2 and 3, a filtering element 10 is shown in various views. The element 10 has a vertically extending closed header 12 and a vertically extending open header 14. The closed header 12 and open header 14 are held in an opposed horizontally spaced relationship by one or more side plates 16 or struts 18 extending between the closed header 12 and open header 14. Preferably, the closed header 12 and open header 14 are rectangular solids (but for cavities etc.) and the side plates 16 are attached to the closed header 12 and open header 14 by snap fittings 20, although screws, glue or other appropriate fasteners may be used. The struts 18 are preferably cylindrical with grooved ends 22 which snap into recesses 24 in the closed header 12 and open header 14.

When an element 10 is used alone, two side plates 16 are used, one on each side of the closed header 12 and open header 14. Alternately, a plurality of elements 10 can be placed side by side in a row, as will be described further below. In that case a combination of a side plate 16 on one side of the element 10 and one or more struts 18 on the other side of the element 10 is used, as illustrated, except for the last element 10 in the row which has two side plates 16. In this way, a single side plate 16 between two elements 10 serves both such elements 10. Side plates 16, open headers 12 and closed headers 14 define vertical flow channels 72 through elements 10.

A plurality of hollow fibre membranes 26 are attached to and suspended between the closed header 12 and the open header 14. The membranes 26 have at least one open end 32 each. The open ends 32 of the membranes 26 are held in a closely spaced apart relationship in a plug of potting resin 30 which encloses one or more permeate channels 28 of the open header 14. The resin 30 surrounds each open end 32 of the membrane 26 so that water cannot enter the permeate channel 28 other than by passing through the walls of the membranes 26. The interior of the membranes 26 are in fluid communication with the one or more permeate channels 28 so that permeate withdrawn through the membranes 26 can be collected in the one or more permeate channels 28. Suitable potting techniques are known in the art. Another suitable technique is described in the applicants Canadian Patent Application No. 2,290,053. Suitable resins 30 include polyurethane, epoxy, rubberized epoxy and silicone resin. One or more resins 30 may also be used in combination to meet objectives of strength and providing a soft interface with the membranes 26 having no cutting edges.

The membranes 26 have a pore size in the microfiltration or ultrafiltration range, preferably between 0.003 and 10 microns and more preferably between 0.01 and 1.0 microns. The membranes 26 may each be a distinct fibre having only a single open end 32 each, but preferably the membranes 26 are made of looped fibres having open ends 32 in fluid communication with a permeate channel 28 of the open header 14 and looped ends 34 connected to the closed header 12. The membranes 26 are unsupported internally (ie. by a substrate) or externally (ie. by transverse fibres) and can be made, for example, of cellulose acetate, polypropylene, polyethylene, polysulfone and preferably of a complex of PVDF and calcined .alpha.-alumina particles as described in U.S. Pat. No. 5,914,039. In order to produce a large surface area, the membranes 26 preferably have small outside diameters in the range of 0.2 mm to 1.0 mm. With such small diameter membranes 26, head loss in the lumen of the membranes 26 is significant and preferred effective lengths of fibre are short—between 0.2 m for smaller diameter fibres to 1.0 m for larger fibres. The effective length is defined as the maximum distance between an un-potted point on the membranes 26 and the proximal face of the open header 14 and, accordingly, each loop of a membrane 26 is approximately twice the effective length plus length required for potting.

With membranes 26 as described above, the tensile strength of the membranes 26 is low and the forces applied to the membranes 26 by aeration are a concern. By arranging the membranes 26 as loops with their looped ends 34 attached to the closed header 12, the unsupported length of the membranes, and thus the forces on the membranes 26 from aeration, are reduced in half compared to the usual configuration wherein horizontal membranes are suspended between two permeating headers. The membranes 26 do not need to be sealingly secured to the closed header 12 but are preferably fixedly attached so that tensile forces in the membranes 26 are transferred to the closed header 12. As an example, membranes 26 made of complex of PVDF and calcined .alpha.-alumina particles, as mentioned above, with an outside diameter of 0.6 mm and an inside diameter of 0.35 mm are suitable for an element 10 in which the proximal faces of the closed header 12 and the open header 14 are spaced less than 0.7 m apart, preferably between 610 and 615 mm apart.

The membranes 26 are mounted such that the un-potted length of the membranes 26 is between 0.1% and 5% greater than the distance between the closed header 12 and the open header 14. This slackness of the membranes 26 allows them to vibrate under the influence of scouring bubbles which aids in inhibiting their fouling. Additionally, the membranes 26 may be slanted slightly upwards towards the open header 14 at about 5 degrees as measured along a line from their looped ends 34 to their open ends 32. The angle of the membranes 26 assists in withdrawing air from the looped ends 34 of the membranes 26 when a new module is first used after manufacture or some maintenance procedures. In many cases, however, air in the lumens of the membranes 26 leaves the membranes 26 shortly after a transmembrane force is applied to the membranes 26. In these cases, the membranes 26 are preferably mounted substantially horizontally rather than slanted.

The open header 14 and closed header 12 are injection moulded or machined from a suitable plastic such as PE, PP, polyester or polycarbonate. The closed header 12 and open header 14 are less than 1 m in length which is more convenient for injection moulding and allows various numbers of elements 10 to be stacked on top of each other to more completely fill tanks of varying depths. The open header 14 preferably has permeate channels 28 each between 30 mm and 40 mm wide. The closed header 12 has corresponding potting cavities 36 of similar width. A bundle of membranes 26 between 20 and 30 mm wide is potted between each permeate channel 28 and its corresponding potting cavity 36. Adjacent bundles of membranes are spaced about 5 mm and 20 mm apart. The width and spacing of the bundles helps water and air bubbles to penetrate the bundle while still providing a large surface area of membranes 26, preferably over 500 m2 of surface area for each cubic metre of volume of the element 10.

As an example, a suitable element 10 has a closed header 12 and open header 14 that are about 700 mm long and 100 mm wide. Each closed header 12 and open header 14 has two permeate channels 28 and potting cavities 36, respectively, about 35 mm wide and about 600 mm long. The element 10 is provided with approximately 31,000 membranes 26 of 0.6 mm outside diameter and between 610 and 615 mm in length arranged in two bundles about 25 mm wide for a total surface area of approximately 36 m2 or more than 700 m2 of surface area for each cubic metre of volume of the element 10. At a flux of 30 L/m2/h, for example, the element 10 produces about 1.1 m3/h of permeate.

Figure 5:
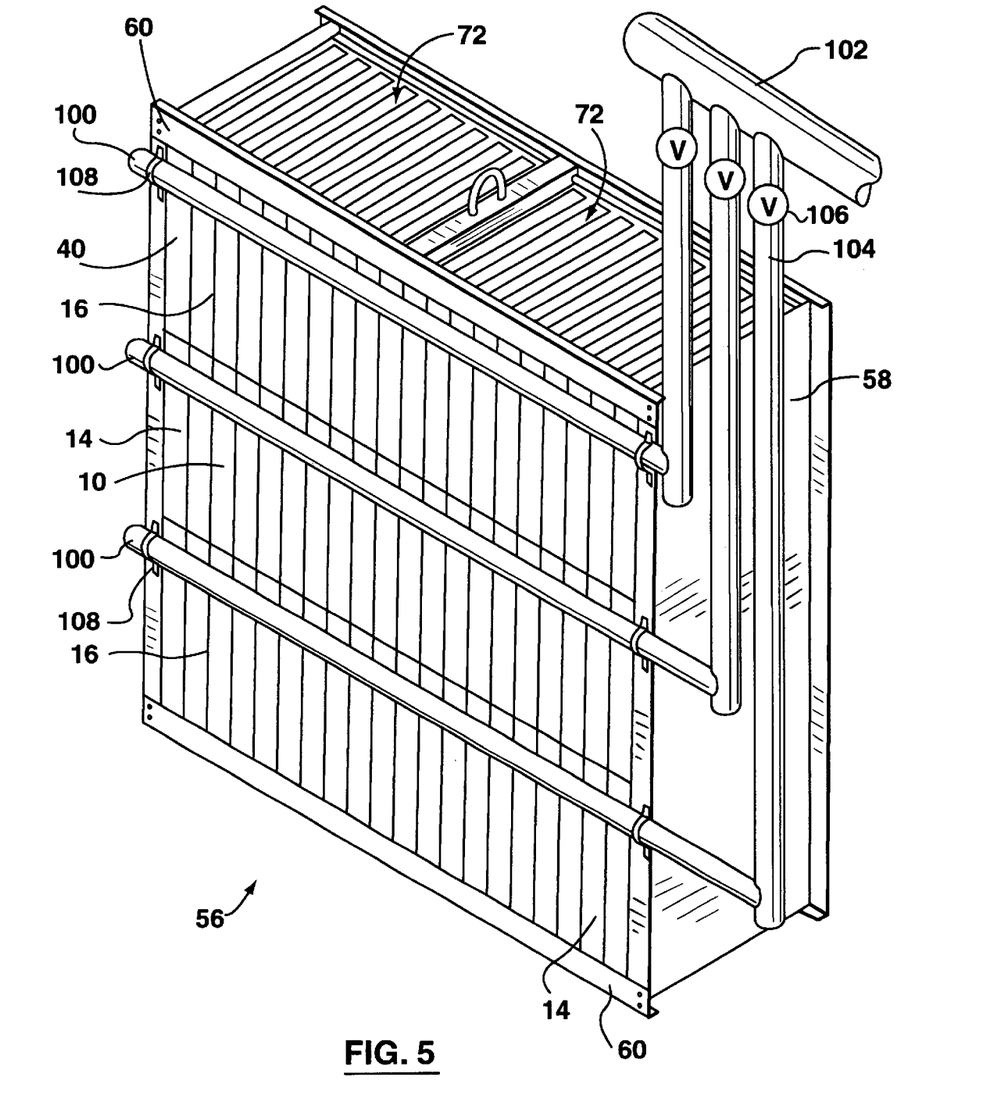
FIG. 5 is an isometric view of a module of the elements of FIGS. 1 through 3 from the back.

In FIG. 5, a module 56 having several elements 10 is shown from where the backs 40 of the elements 10 are visible. The elements 10 are placed side by side in rows such that the side plates 16, closed headers 12 and open headers 14 form a plurality of directly adjacent vertical flow channels. A module 56 can have a single row of elements 10 or multiple rows such that the elements 10 are arranged in a vertical orthogonal grid as illustrated. In such a grid, the side plates 16, closed headers 12 and open headers 14 of the elements 10 form a plurality of directly adjacent vertical flow channels 72 that extend through the module 56. The module 56 illustrated has three rows of twenty elements 10 each but the number and arrangement of elements 10 shown gives an example only. Modules 56 may be constructed in a large range of heights and widths to best fit a given tank. The exterior of the module 56 is constructed of two solid side walls 58 held in place by rails 60 sized to accommodate a desired number and arrangement of elements 10. A handle 62 at the top of the module 56 allows the module 56 to be lifted or lowered.

Now referring to FIGS. 1 through 4, a permeate opening 38 (of about 25 mm in diameter for the element 10 described above) connects an upper end of the permeate channels 28 to the back 40 of the open header 14 of an element 10. The permeate opening 38 is adapted to receive a permeate tap 42 of a permeate fitting 42 shown in FIG. 4. The permeate opening has one or more grooves 46 sized to fit one or more O-rings 48 on the permeate tap 42. The O-ring(s) 48 and groove(s) 46 create a releasable and resealable water tight seal between the element 10 and a permeate fitting 44.

Figure 4:
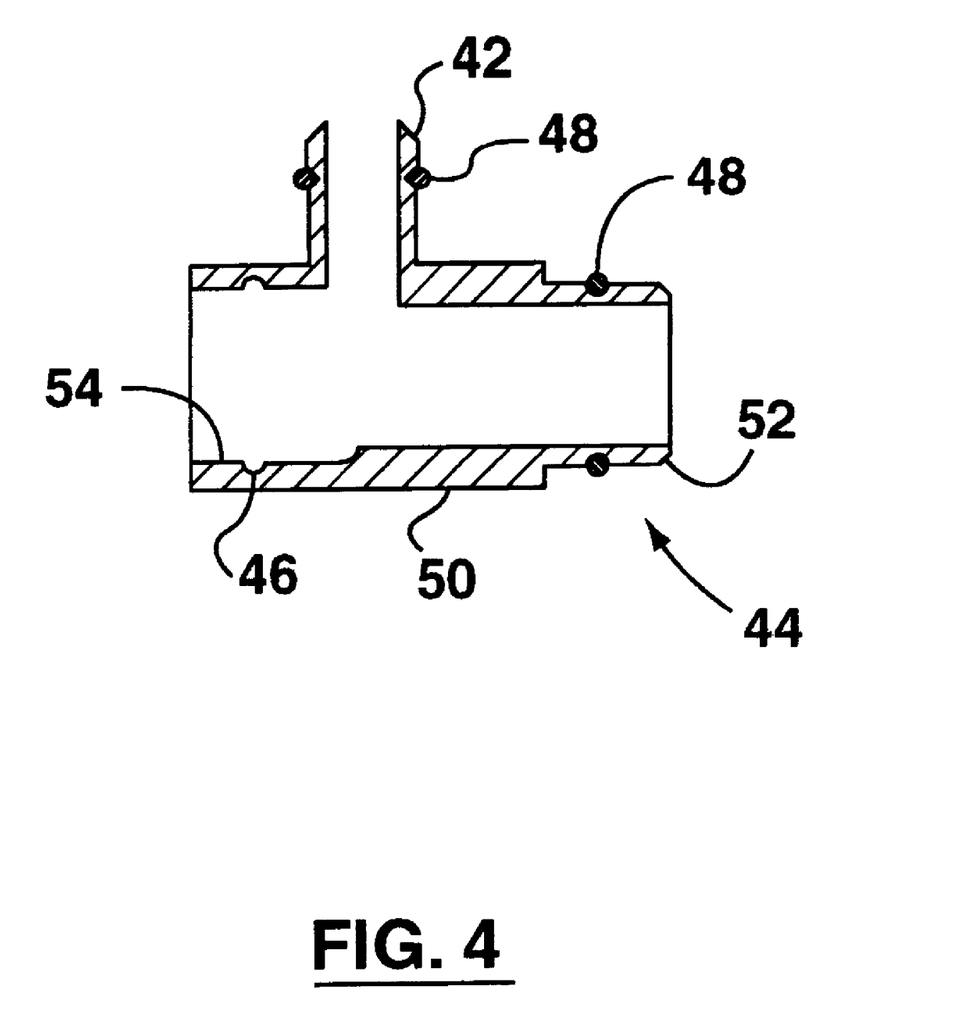
FIG. 4 is a sectional view of a permeate fitting for use with the element of FIGS. 1 through 3.

Now referring to FIGS. 4 and 5, the permeate fitting 44 also has a body 50 (of about 50 mm in outside diameter for the element 10 described above) having a male part 52 and a female part 54. The body 50 corresponds in length to the spacing between adjacent elements 10. The male part 52 fits into the female part 54 of an adjacent permeate fitting 44 with a releasable water tight seal provided by O-rings 48. In this way, the permeate fittings 54 of multiple elements 10 placed side form a continuous permeate collector 100. Alternatively, adjacent permeate fittings 44 can be attached to each other by gluing or ultrasonically welding them to produce a permeate collector 100 or a single pipe can be fitted with the required number and spacing of permeate taps 42. Straps 108 hold the permeate collectors 100 in position relative to the module 56.

The permeate collectors 100 are attached to a permeate trunk 102 through intermediate pipes 104 and valves 106. The permeate collectors 100 can be arranged in numerous ways. In one arrangement, each permeate collector 100 is associated only with elements 10 in a single horizontal row of the orthogonal grid of the module 56. Valves 106 associated with the permeate collectors 100 are arranged to allow a gas for bubble point integrity testing of the elements 10 to flow only to elements 10 in a single horizontal row of the orthogonal grid. The integrity of the elements 10 of a module 56 can be tested by flowing a gas at a selected pressure, calculable as known in the art, into the lumens of the membranes 26 in the module 56. The arrangement of valves 106 and permeate collectors 100 described above allows an operator to flow the gas at selected times only to elements 10 in a single horizontal row of the orthogonal grid. The presence of bubbles in a vertical flow channel 72 indicates a defect in the element 10 in that column of the orthogonal grid and in the row receiving the gas. Once located, a defective element 10 is replaced with a new element 10 allowing permeation to resume while the defective element 10 is repaired.

In an alternate arrangement, not illustrated, vertical permeate collectors are attached in fluid communication with a small number, preferably three, elements 10 in each of the rows of a module 56. This arrangement allows smaller pipes (typically 25 mm in diameter) for permeate collectors and removes the need for intermediate pipes 104 thus occupying less of the footprint of a tank. This arrangement also reduces the effect of pressure drop in a horizontal permeate collector 100 which can limit the maximum number of elements 10 that can be placed side by side in a module 56. To perform an integrity test with this arrangement, the gas is flowed into the lumens of the membranes 26 but at a plurality of selected pressures. The selected pressures are substantially equal to the bubble point of a defect of interest plus the static head of each row of elements 10 in the module 56. Preferably, the selected pressures are applied to the lumens of the membranes 26 sequentially from the lowest pressure to the highest pressure. While not as certain as the first integrity testing method, the pressure at which bubbles appear suggests the row in which a defect exists without the need for valves 106. Once located, a defective element 10 is replaced with a new element 10 allowing permeation to resume while the defective element 10 is repaired.

Figure 6:
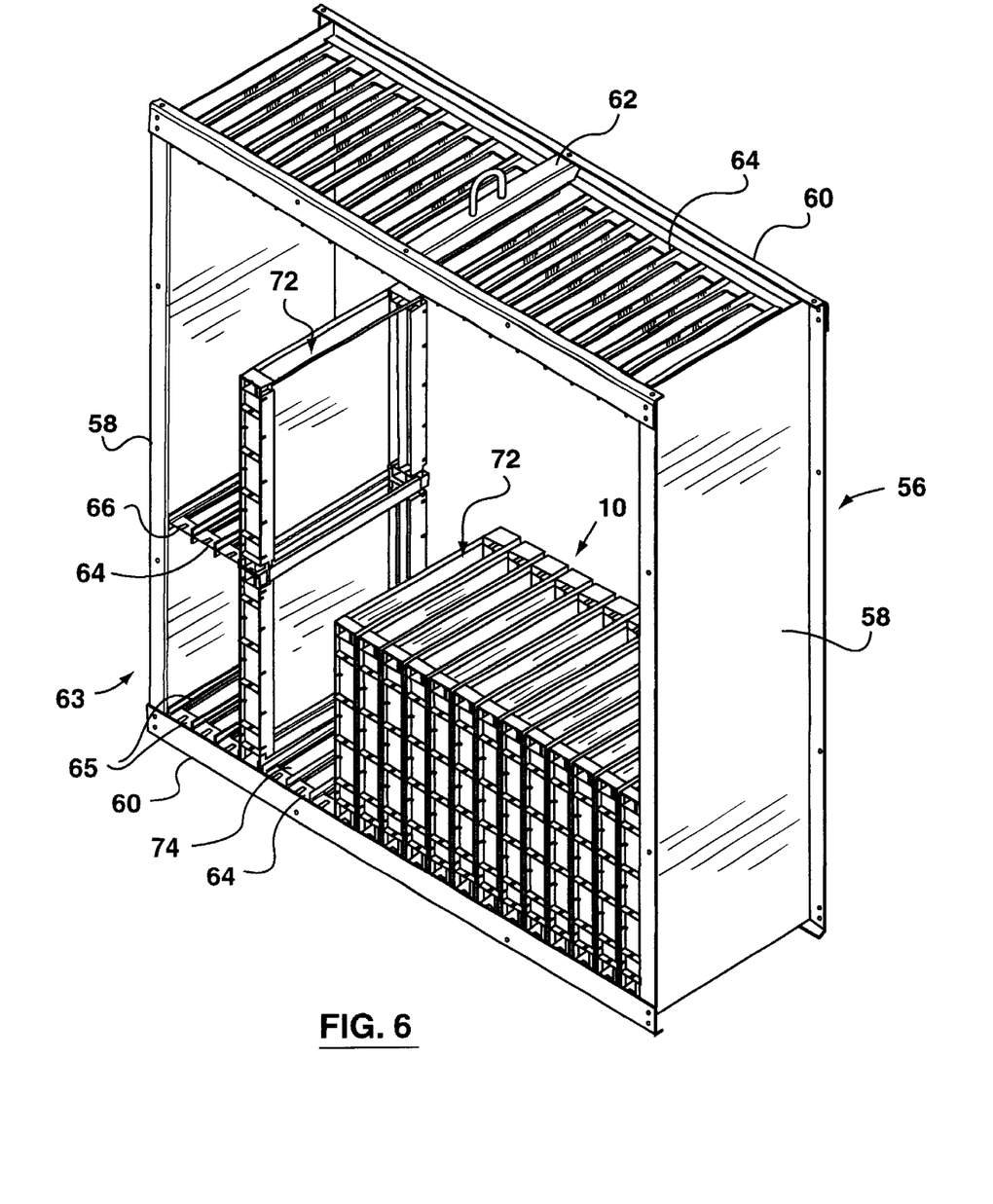
FIG. 6 is an isometric view of a module of FIG. 5 from the front.
Figure 7:
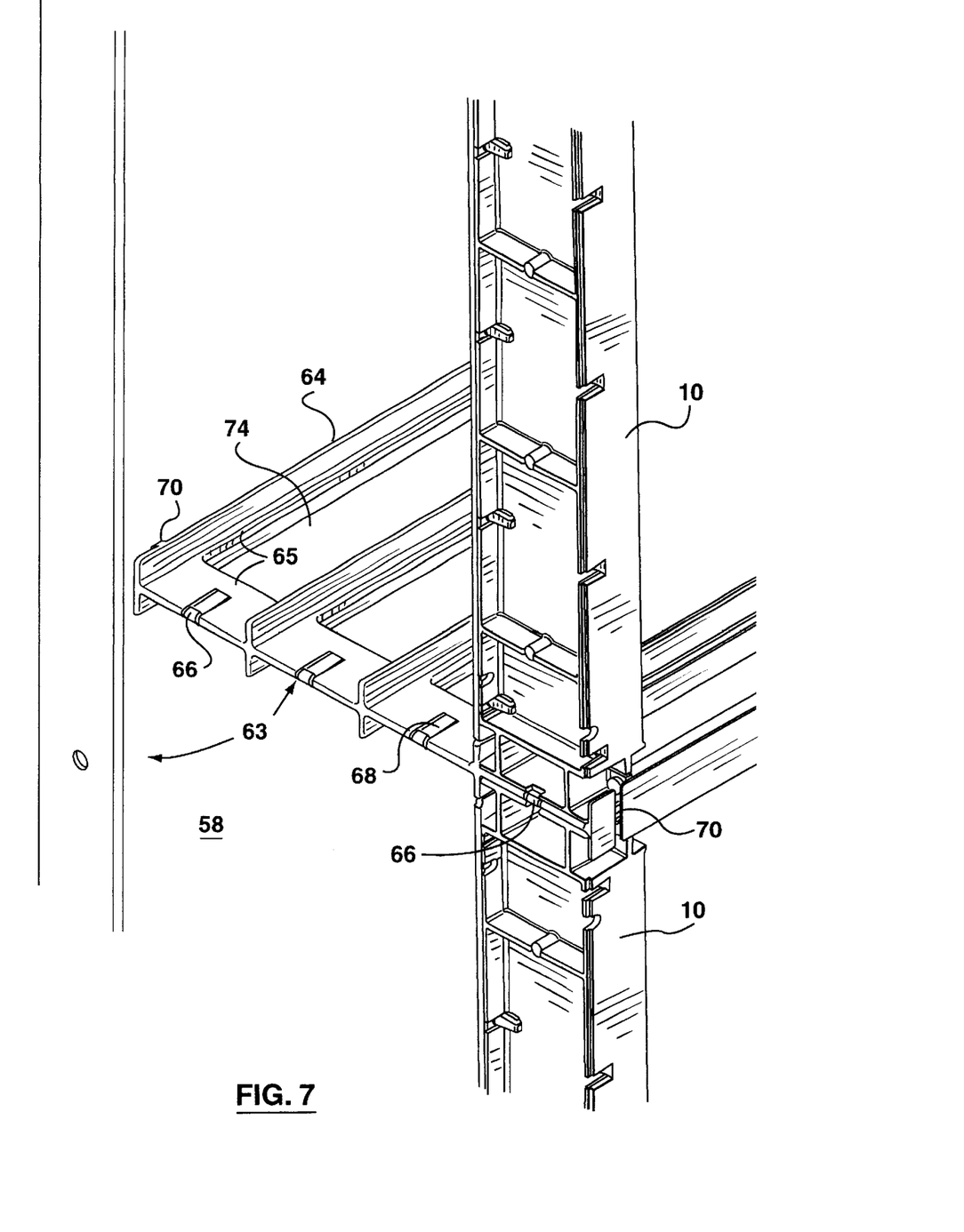
FIG. 7 is an enlarged view of a portion of the module of FIG. 6.

Referring to FIGS. 6 and 7, the front of the module 56 is shown in greater detail but many elements 10 are not shown so that the assembly of the module 56 can be illustrated. Within the module 56, elements 10 are held in place by a frame 63 comprising the side walls 58, rails 60 and racks 64. The frame 63 restrains the elements 10 in place but does not obstruct the vertical flow channels 72. Further, the restraint provided by the frame 63 can be released for a selected element 10 in a direction substantially normal to the headers of the selected element 10 or the grid, the direction in the module 56 illustrated being a horizontal direction. The selected element 10 may be removed from the module 56 when such restraint is released without disassembling the remainder of the module 56. In the module 56 illustrated, an element 10 is removed by pulling it forward out of its row. When an element 10 is removed from the module 56, the movement in the horizontal direction releases the seal between the element 10 and the permeate collector 100. When the element 10 is replaced, the movement in a reverse direction reseals the element 10 to the permeate collector 100.

The ability to releasably restrain elements 10 is provided in the module 56 illustrated by means of the racks 64. Each rack 64 has a bearing surface 65 to slidably support an element 10. The bearing surface 65 is oriented in the direction substantially normal to the open header 12 of the element 10, the direction in which the element 10 moves when it is removed from the module 56. Similarly, the racks 64 are sized to allow an element 10 to slide in the direction substantially normal to the open header 12 into the space between an upper rack 64 and a lower rack 64. The racks 64 are preferably symmetrical so that the same rack 64 can accept an element 10 above the rack 64, below the rack 64 or both. The rear of each rack 64 is provided with a stop (not illustrated) which engages the back 40 of an element 10. The front of each rack has a releasable catch 66 which engages the front of elements 10 above and below it to secure the elements 10 in the rack 64. The catch 66 has a recess 68 which allows it to be flexed upwards or downwards to release an element 10.

Several racks 64 can be attached side by side to form a line of racks 64 extending between the side walls 58 of a module 56. The racks 64 can be attached by moulding them together in convenient numbers, such as four as illustrated, and attaching these mouldings to adjacent mouldings by fasteners or dovetail joints 70. Preferably, each racks 64 is rigidly attached to at least one adjacent rack 64. To assemble a module 56, a first line of racks 64 is placed between the lower rails 60, the lower rails 60 being adapted to hold the racks 64 so that a sufficient amount of the racks 64 project above the rails 60. A first row of elements 10 is than placed on the first line of racks 64 followed by subsequent rows of elements 10 and racks 64. When an upper row of elements 10 is ready to be installed, an upper line of racks 64 is held temporarily in place between the upper rails 60 until enough elements 10 have been slid into position. Once all elements 10 and racks 64 are installed, any element 10 can be removed from the module 56 by moving the appropriate catches 66 and sliding the element 10 forward. Provided that an excessive number of elements 10 are not removed at one time, the remaining racks 64 and elements 10 remain stable.

As mentioned above, the permeate fittings 44 are inserted into the permeate opening 38 of each element 10 and joined to adjacent permeate fittings 44 to create a continuous permeate collector 100. This continuous collector 100 is fixedly attached to the module 56 such that removing an element 10 from the module 56 causes it to detach from its associated permeate fitting 44. The permeate fitting 44 remains attached to the module 56 so that a replacement element 10 can be inserted into the module 56 and engage the permeate fitting 44. Maintenance or repair procedures can thus be accomplished by lifting the module 56 from a tank, pulling out an element 10 to be maintained or repaired, replacing it with a spare element 10 and replacing the module 56 in its tank.

Referring to FIG. 6, when the elements 10 are attached side-by-side and stacked one on top of the other, the side plates 16 of adjacent elements 10 define vertical flow channels 72 through the module 56 containing the membranes 26. If the side walls 58 are not solid, the last element 10 has an additional side plate 16 to define a flow channel 72 in it. The racks 64 have corresponding openings 74 which allow the flow channels 72 to be in fluid communication with tank water outside of the module 56. The width of the flow channels 72, in combination with the slackness of the membranes 26, is such that the membranes 26 move sideways enough to substantially fill a central portion of the flow channels 72, the central portion preferably being between a third and two thirds of the distance between the proximal faces of the open header 14 and closed header 12 in length. The reduced length of the membranes 26, compared to a design in which permeate is withdrawn from both ends of the membranes 26, tends to reduce tangling of the membranes 26 and reduces the width of the flow channel 16 allowing more compact elements 10. The side plates 16 also protect the membranes 26 from damage during shipping, installation or maintenance and temporary side plates 16 are used as necessary when elements 10 are handled.

Figure 8:
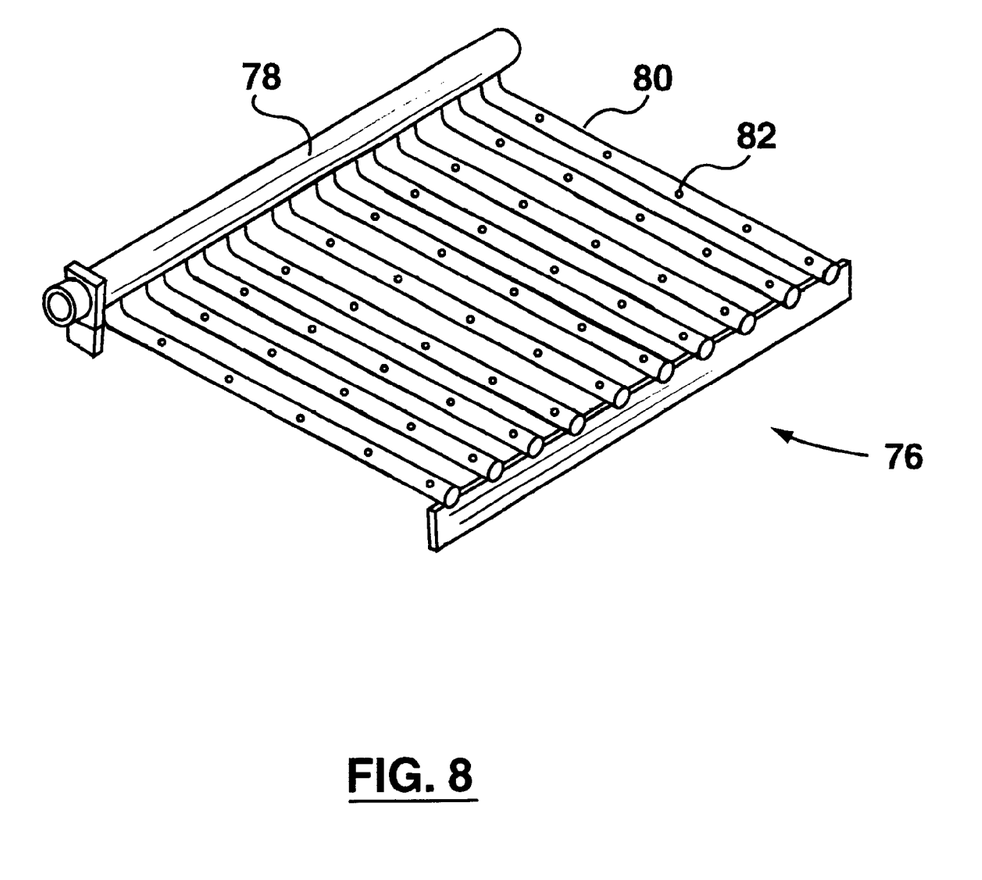
FIG. 8 is an isometric view of a sub-module aerator.

Referring now to FIG. 8, a sub-module aerator 76 is shown having a header 78 connected to a series of parallel conduit aerators 80 having holes 82 to produce air bubbles. The spacing between the conduit aerators 80 is preferably the same as the width of the elements 10. Alternately, the conduit aerators 80 can be placed perpendicular to the elements 10 and the holes 82 spaced apart by the width of the elements 10. In either way, the sub-module aerator 76 can be installed to provide a source of air holes 82 directly below the flow channel 72 of each element 10. Such an arrangement promotes a controlled amount of aeration being provided to each element 10 and minimizes air flow channelling which can starve membranes 10 of air, particularly when aeration rates are low. If required, a conduit aerator 80, or a hole 82 in a conduit aerator 80 perpendicular to the elements 10, can be provided directly below the side plate 16 between each pair of elements 10 to similar effect, although the first arrangement described is preferred.

In use, one or more elements 10 or modules 56 are placed in a tank of water to be filtered such that the membranes 26 are immersed in the water to be filtered. The design of the elements 10 and modules 56 allows a large surface area of membranes 26 to be placed in a tank. For example, in a conventional filtering reactor, using aeration to both agitate the membranes 26 and to generate an airlift to circulate water to be filtered, about 50% of the tank area is covered with modules 56. Such modules 56 can provide over 400 m$^2$ of surface area of membranes 26 for each m$^2$ of footprint or horizontal cross-sectional area of a tank.

Rather than using this large surface area to generate a large yield, however, a preferred process uses a low or moderate flux of less than 50 L/m$^2$/h and preferably less than 35 L/m$^2$/h. Such a flux provides yields comparable to sand filtration. For example, modules 56 covering 50% of the footprint of a tank can produce a superficial tank velocity of over 10 m/h at a flux of 25 to 30 L/m2/h. Compared to a more typical flux of 50 to 75 L/m2/h, the reduced flux results in significantly reduced fouling of the membranes 26.

In combination with a low or moderate flux, a preferred process includes periodically stopping permeation. Other process steps are performed during periods of time when permeation is periodically stopped. The other process steps include backwashing the modules 56 from time to time, aerating the modules 56 to scrub or inhibit fouling of the membranes 26 from time to time, and emptying and refilling the tank from time to time to remove accumulated solids. Such a process requires surprisingly little aeration to maintain adequate permeability of the membranes 26. In particular, aerating the modules 56 to scrub the membranes 26 during periods of time when permeation is periodically stopped is done at a superficial velocity (m$^3$/h of air at standard conditions per m$^2$ of module cross-sectional area) of 80 m/h to 340 m/h, depending on feed water quality.

Aeration to scrub or inhibit fouling of the membranes 26 preferably occurs during periods of time when permeation is stopped because during these periods the aeration does not need to overcome suction on the membranes 26 to dislodge solids from the membranes 26. For many if not most feed waters, aeration to inhibit fouling is not required at other times. During permeation, however, the concentration of solids in the water to be filtered can increase within the modules 56. For some feed waters, typically having high turbidity and solids concentrations more than about 500 mg/L, a smaller amount of aeration is advantageously provided during permeation to disperse solids from the modules 56, particularly from any dead zones in the modules 56, or to generally homogenize the contents of the tank. For this purpose, aeration is provided during permeation intermittently at a superficial velocity of 80 m/h to 340 m/h or continuously at a rate less than 80 m/h.

Surprisingly, the energy cost savings produced by operating at low flux and low aeration significantly offsets the cost of providing a large surface area of membranes 26 in the form of the elements 10 and second modules 56 described above. The inventors believe that the design of the modules 56, for example the horizontal orientation of the membranes 26, the distribution of membranes 26 in the flow channels 72 and the flow of tank water through the flow channels 72, assists in reducing the amount of aeration required and allows the invention to be competitive with sand filtration for filtering potable water.

It is to be understood that what has been described are preferred embodiments of the invention. The invention nonetheless is susceptible to certain changes and alternative embodiments without departing from the subject invention, the scope of which is defined in the following claims.

We claim:

1. An element of filtering hollow fibre membranes comprising:
   (a) a pair of opposed horizontally spaced, vertically extending headers;
   (b) side plates extending between the pair of vertically extending headers on one or both sides of the pair of vertically extending headers, wherein the side plates of the element, when side plates extend between both sides of the headers, or the side plates of the element and an adjacent element, when side plates extend from one side of the headers, define a vertical flow channel through the element, wherein the vertical flow channel extends between the top and bottom of the element, and is open at the top and bottom of the element;
   (c) a plurality of hollow fibre membranes attached to and suspended between the pair of vertically extending headers, the hollow fibre membranes,
      (i) having each at least one open end;
      (ii) having each an outer surface, the outer surfaces of the open ends of the hollow fibre membranes connected to at least one header with a water impermeable connection;
      (iii) being suspended with between 1% and 5% slack; and,
      (iii) being arranged in bundles wherein the membranes in the bundles, when dispersed, move sideways to extend across substantially the entire width of the element within a central portion of the vertical flow channel, the central portion occupying at least a third of the distance between the proximal faces of the headers; and,
   (d) one or more permeate channels in at least one of the headers in fluid communication with the interior of the hollow fibre membranes for collecting a permeate drawn through the hollow fibre membranes.

2. The element of claim 1 wherein the bundles of hollow fibre membranes are between 20 mm and 30 mm wide and the bundles are potted with a space of 5 mm to 20 mm between them.

3. The element of claim 1 wherein only one header of the pair of headers has a permeate channel and the hollow fibre membranes are fixedly attached to both headers.

4. The element of claim 3 wherein the hollow fibre membranes have a length between 0.2 m and 0.7 m and an outside diameter between 0.2 mm and 1 mm.

5. A module of filtering hollow fibre membranes comprising,
   (a) a plurality of elements placed side by side each having
      (i) a pair of opposed horizontally spaced, vertically extending headers,
      (ii) a plurality of hollow fibre membranes attached to and suspended between the pair of vertically extending headers, the hollow fibre membranes (I) having each at least one open end and (II) having each an outer surface, the outer surfaces of the open ends of the hollow fibre membranes connected to at least one header with a water impermeable connection and,
      (iii) one or more permeate channels in at least one of the headers in fluid communication with the interior of the hollow fibre membranes for collecting a permeate drawn through the hollow fibre membranes,
   wherein the elements are adapted to permit water to flow vertically through the elements; and,
   (b) a frame for restraining the elements in place without obstructing the vertical flow of water through the elements but wherein (a) the restraint provided by the frame for a selected element is releasable in a direction substantially normal to the headers of the selected element, (b) the selected element may be removed from the module when the restraint for the element in the direction substantially normal to its headers is released without disassembling the remainder of the module.

6. The module of claim 5 wherein the frame includes a plurality of racks, each rack having (a) a bearing surface to slidably support an element oriented in the direction substantially normal to the headers of the element, (b) a stop at one end of the bearing surface, and (c) a releasable catch at the other end of the bearing surface.

7. The module of claim 5 wherein each element has an associated releasable and resealable water tight fitting between the element and a permeate collector, the releasable and resealable water tight fitting being releasable by moving the element in the direction substantially normal to the headers of the element and resealable by moving the element in a reverse direction.

8. A module of filtering hollow fibre membranes comprising,
   a plurality of elements each having
      (i) a pair of opposed horizontally spaced, vertically extending headers,
      (ii) a side plate extending between the pair of vertically extending headers on a side of the pair of vertically extending headers,
      (iii) a plurality of hollow fibre membranes attached to and suspended between the pair of vertically extending headers, the hollow fibre membranes, (I) having each at least one open end (II) having each an outer surface, the outer surfaces of the open ends of the hollow fibre membranes connected to at least one header with a water impermeable connection and,
      (iv) one or more permeate channels in at least one of the headers in fluid communication with the interior of the hollow fibre membranes for collecting a permeate drawn through the hollow fibre membranes,
   wherein the elements are arranged in a vertical orthogonal grid having a plurality of rows and columns and the side plates and headers of the elements form a plurality of directly adjacent vertical flow channels, each flow channel extending through a column of elements.

9. The module of claim 8 further comprising an aerator below the module having a plurality of air holes located to provide a line of air holes below each element or below a side plate between each pair of elements.

10. A module of filtering hollow fibre membranes comprising,
    (a) a plurality of elements arranged in a vertical orthogonal grid, each element having (i) a pair of opposed horizontally spaced, vertically extending headers, (ii) a plurality of hollow fibre membranes attached to and suspended between the pair of vertically extending headers, the hollow fibre membranes, (I) having each at least one open end and (II) having each an outer surface, the outer surfaces of the open ends of the hollow fibre membranes connected to at least one header with a water impermeate connection and, (iii) one or more permeate channels in at least one of the headers in fluid communication with the interior of the hollow fibre membranes for collecting a permeate drawn through the hollow fibre membranes, wherein the elements are adapted and arranged to permit water to flow vertically through the elements; and, a frame for restraining the elements in the orthogonal grid without obstructing the vertical flow of water through the elements but wherein (a) the restraint provided by the frame for a selected element is releasable in a direction substantially normal to the grid, (b) the selected element may be removed from the module when the restraint for the element in the direction substantially normal to the grid is released without disassembling the remainder of the module.

11. The module of claim 10 wherein the frame includes a plurality of racks, each rack having (a) a bearing surface oriented in the direction substantially normal to the grid to slidably support an element, (b) a stop at one end of the bearing surface, and (c) a releasable catch at the other end of the bearing surface.

12. The module of claim 10 wherein each element has an associated releasable and resealable water tight fitting between the element and a permeate collector, the releasable and resealable water tight fitting being releasable by moving the element in the direction substantially normal to the grid and resealable by moving the element in a reverse direction.

* * * * *